US012534941B2

(12) United States Patent
Zhang et al.

(10) Patent No.: US 12,534,941 B2
(45) Date of Patent: Jan. 27, 2026

(54) BAR LOCK

(71) Applicant: Austin Hardware & Supply, Inc., Lee's Summit, MO (US)

(72) Inventors: Daye Zhang, Buford, GA (US); Robert Walden, Buford, GA (US); David Lay, Buford, GA (US)

(73) Assignee: Austin Hardware & Supply, Inc., Lee's Summit, MO (US)

( * ) Notice: Subject to any disclaimer, the term of this patent is extended or adjusted under 35 U.S.C. 154(b) by 299 days.

(21) Appl. No.: 17/896,414

(22) Filed: Aug. 26, 2022

(65) Prior Publication Data

US 2023/0068173 A1 Mar. 2, 2023

Related U.S. Application Data

(60) Provisional application No. 63/237,824, filed on Aug. 27, 2021.

(51) Int. Cl.
*E05B 83/10* (2014.01)

(52) U.S. Cl.
CPC .................................... *E05B 83/10* (2013.01)

(58) Field of Classification Search
CPC .......... E05B 83/02; E05B 83/08; E05B 83/10; E05B 83/12; E05B 17/0025; E05C 19/001; E05C 19/002; E05C 19/003; Y10T 292/3232; Y10T 292/327; Y10T 292/31; Y10T 292/23; Y10S 292/32; Y10S 292/71
See application file for complete search history.

(56) References Cited

U.S. PATENT DOCUMENTS

| | | | | | |
|---|---|---|---|---|---|
| 2,592,647 | A * | 4/1952 | Black | E05B 13/10 | 49/276 |
| 4,483,557 | A * | 11/1984 | Pastva | E05B 15/0245 | 292/218 |
| 4,844,524 | A * | 7/1989 | Pastva | B60J 5/065 | 292/DIG. 32 |
| 6,860,530 | B2 * | 3/2005 | Senn | E05B 17/0025 | 292/259 R |
| 8,146,205 | B2 * | 4/2012 | Conner | E05B 83/10 | 16/389 |
| 9,109,383 | B2 | 8/2015 | Jeffries | | |

FOREIGN PATENT DOCUMENTS

WO WO-2018081316 A1 * 5/2018 ............. B23K 31/02

OTHER PUBLICATIONS

Canadian Office Action issued Jan. 19, 2024, for Canadian Patent Application No. 3172389, 5 pages.

* cited by examiner

*Primary Examiner* — Christine M Mills
*Assistant Examiner* — Christopher F Callahan
(74) *Attorney, Agent, or Firm* — POLSINELLI PC

(57) ABSTRACT

A bar lock includes an upper strap and a lower strap that receives the bar. The upper and lower strap hingedly engage to hinge butts at an opening of a truck. The upper strap forms an upper cylindrical passage that receives the bar. The upper cylindrical passage includes an upper opening and a lower opening. An upper weld is between the upper opening of the upper cylindrical passage and the bar. The lower strap forms a lower cylindrical passage that receives the bar. The lower cylindrical passage includes an upper opening and a lower opening. A lower weld is between the lower opening of the lower cylindrical passage and the bar.

17 Claims, 4 Drawing Sheets

FIG. 4
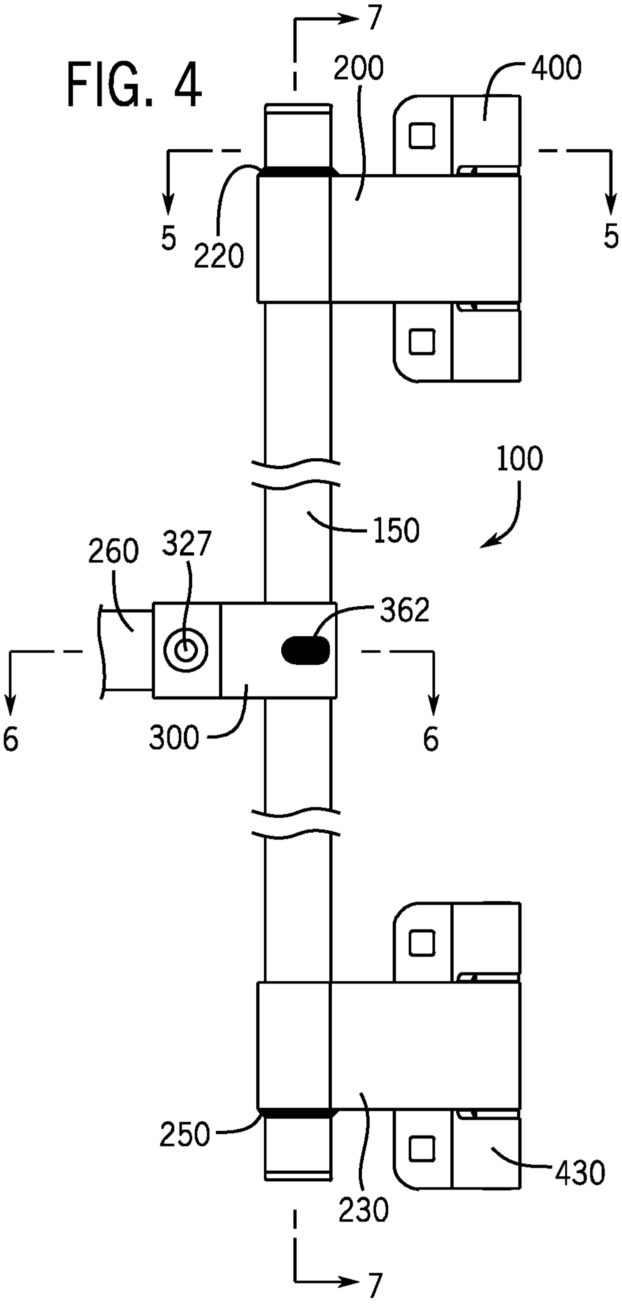
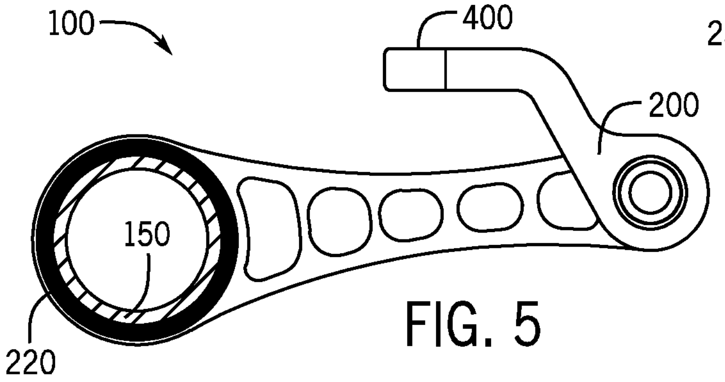
FIG. 5
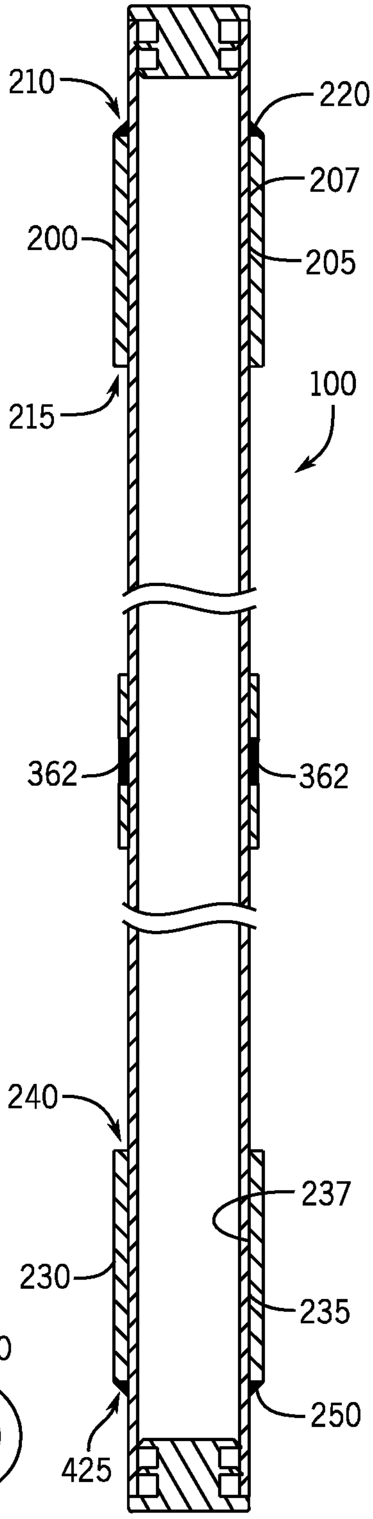
FIG. 7

BAR LOCK

The present application claims priority to U.S. Provisional Patent Application No. 63/237,824 filed Aug. 27, 2021, which is hereby incorporated by reference.

FIELD OF INVENTION

The present invention relates to a bar lock.

BACKGROUND

Bar locks are commonly used to hold doors closed on a truck or commercial vehicle. The bar locks generally pivot or rotate to a holding position where a bar of the bar lock presses against a surface of the door to hold the door closed. A handle of the bar lock is rotatably connected to the bar, and the handle rotates into a bracket on the door. The handle may wedge into the bracket and drive the bar against the door.

SUMMARY

A bar lock is described. Methods of assembling and manufacturing bar locks are also described.

The bar lock includes an upper strap and a lower strap that receives a bar. The upper and lower strap may hingedly engage or connect to hinge butts at an opening of the truck. The upper strap forms an upper cylindrical passage that receives the bar. The upper cylindrical passage includes an upper opening and a lower opening. An upper weld is between the upper opening of the upper cylindrical passage and the bar. The lower strap forms a lower cylindrical passage that receives the bar. The lower cylindrical passage includes an upper opening and a lower opening. A lower weld is between the lower opening of the lower cylindrical passage and the bar.

The placement or positioning of the upper weld and the lower weld assists in providing an improved design as compared to conventional bar locks. The bar lock of the present disclosure exhibits superior or improved strength compared to conventional bar locks. The bar lock of the present disclosure uses less material than conventional bar locks.

In one aspect, a bar lock is described. The bar lock includes a bar. The bar lock includes an upper strap, which forms an upper cylindrical passage that receives the bar. The upper cylindrical passage has an upper opening and a lower opening. An upper weld is between the upper opening and the bar. The bar lock includes a lower strap, which forms a lower cylindrical passage that receives the bar. The lower cylindrical passage has an upper opening and a lower opening. A lower weld is between the lower opening and the bar. A handle bracket is affixed to the bar. A handle is pivotally engaged to the handle bracket.

In another aspect, a bar lock is described. The bar lock includes a bar. The bar lock includes a first strap, which forms a first cylindrical passage that receives the bar. The first cylindrical passage has a first opening and a second opening. A first weld is between the first opening and the bar. The bar lock includes a second strap, which forms a second cylindrical passage that receives the bar. The second cylindrical passage has a first opening and a second opening. A second weld is between the second opening and the bar. The first strap and the second strap are welded to the bar via the first weld and the second weld such that a distance between the first weld and the second weld is greater than a distance between the second opening of the first strap and the first opening of the second strap. A handle bracket is affixed to the bar. A handle is pivotally engaged to the handle bracket.

In another aspect, a method of forming a bar lock is described. The method includes providing a bar, an upper strap, wherein the upper strap forms an upper cylindrical passage having an upper opening and a lower opening, and a lower strap, wherein the lower strap forms a lower cylindrical passage having an upper opening and a lower opening. The method includes inserting the bar through the upper cylindrical passage. The method includes forming an upper weld between the upper opening of the upper strap and the bar. The method includes inserting the bar through the lower cylindrical passage. The method includes forming a lower weld between the lower opening of the lower strap and the bar. The method includes affixing a handle bracket to the bar.

In a further aspect, a bar lock is described. The bar lock includes a bar. The bar lock includes an upper strap, which forms an upper cylindrical passage that receives the bar. The bar is affixed to the upper strap. The bar lock includes a lower strap. The lower strap forms a lower cylindrical passage that receives the bar. The bar is affixed to the lower strap. A handle bracket is affixed to the bar. The handle bracket includes a body defining a cylindrical passage that receives the bar. The body of the handle bracket includes one or more openings that pass through the body and into the cylindrical passage. A plug weld is between the one or more openings and the bar. The plug weld affixes the handle bracket to the bar. A handle is pivotally engaged to the handle bracket.

BRIEF DESCRIPTION OF DRAWINGS

FIG. 4 is a front view of the bar lock.

FIG. 5 is a sectional view of the bar lock and the upper strap.

FIG. 7 is a sectional view of the bar lock along the bar.

DETAILED DESCRIPTION OF INVENTION

Figure 1:
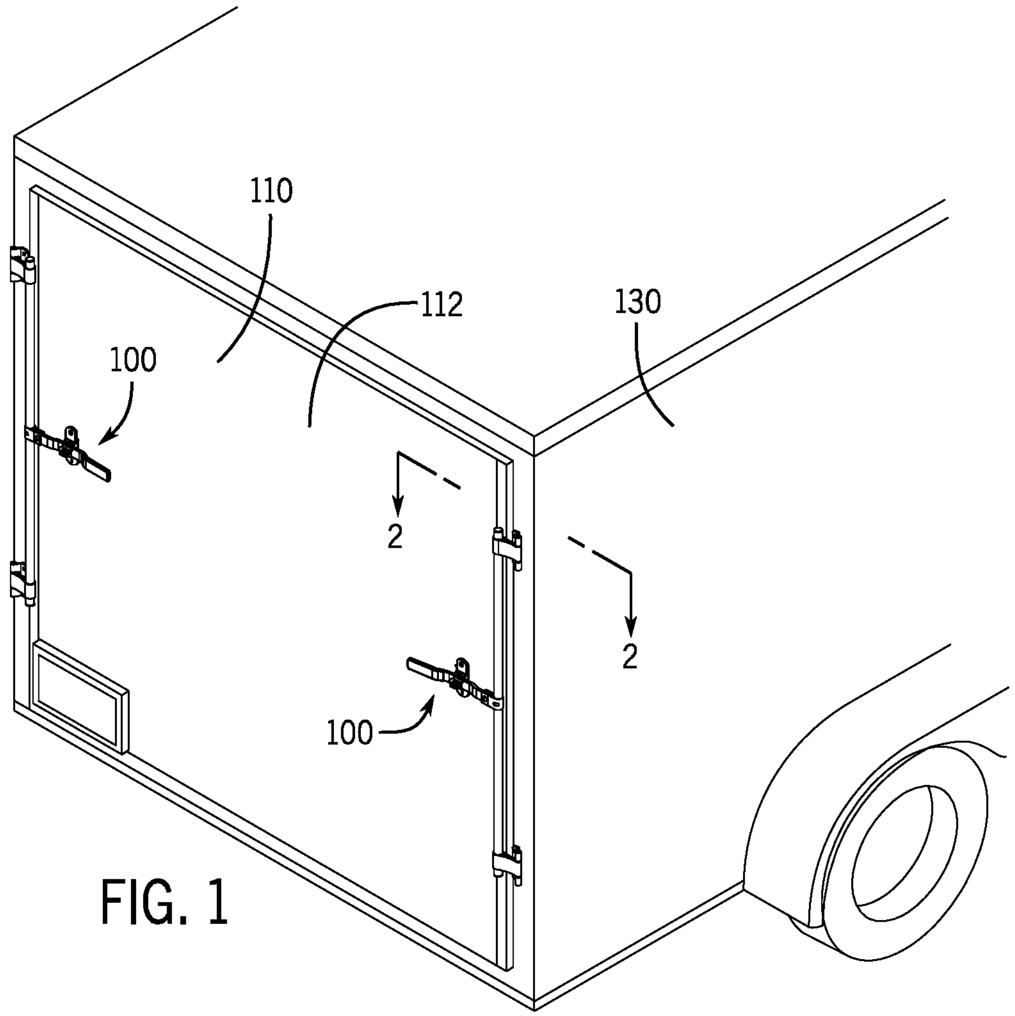
FIG. 1 is a perspective view of the bar lock installed on the door of the truck.
Figure 2:
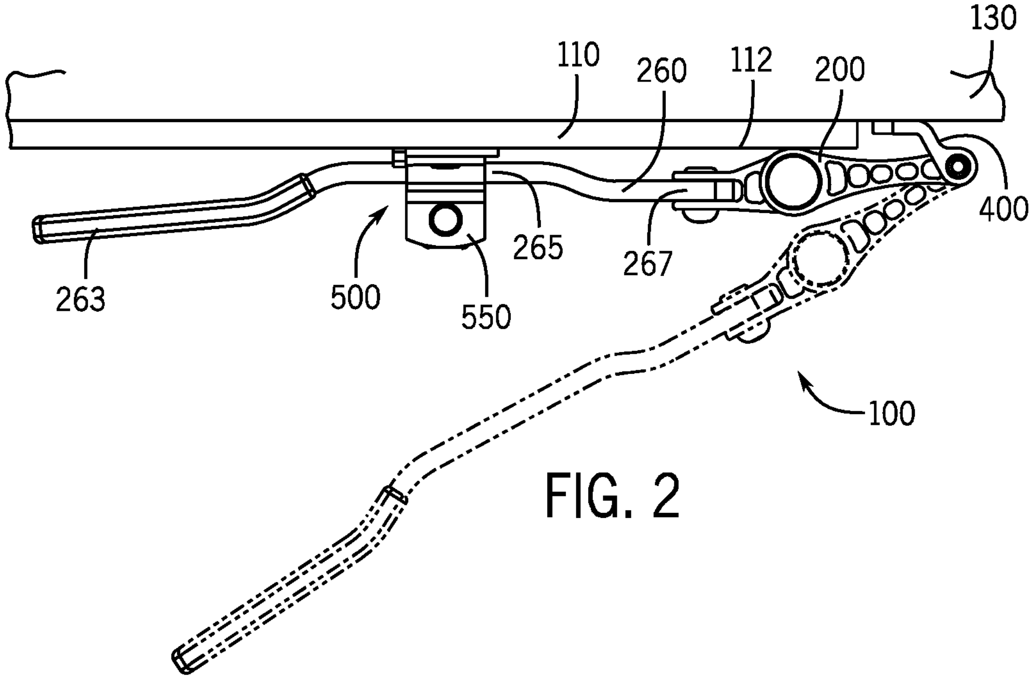
FIG. 2 is a top down view showing the bar moving from the unlocked to the locked position.
Figures 3, 6:
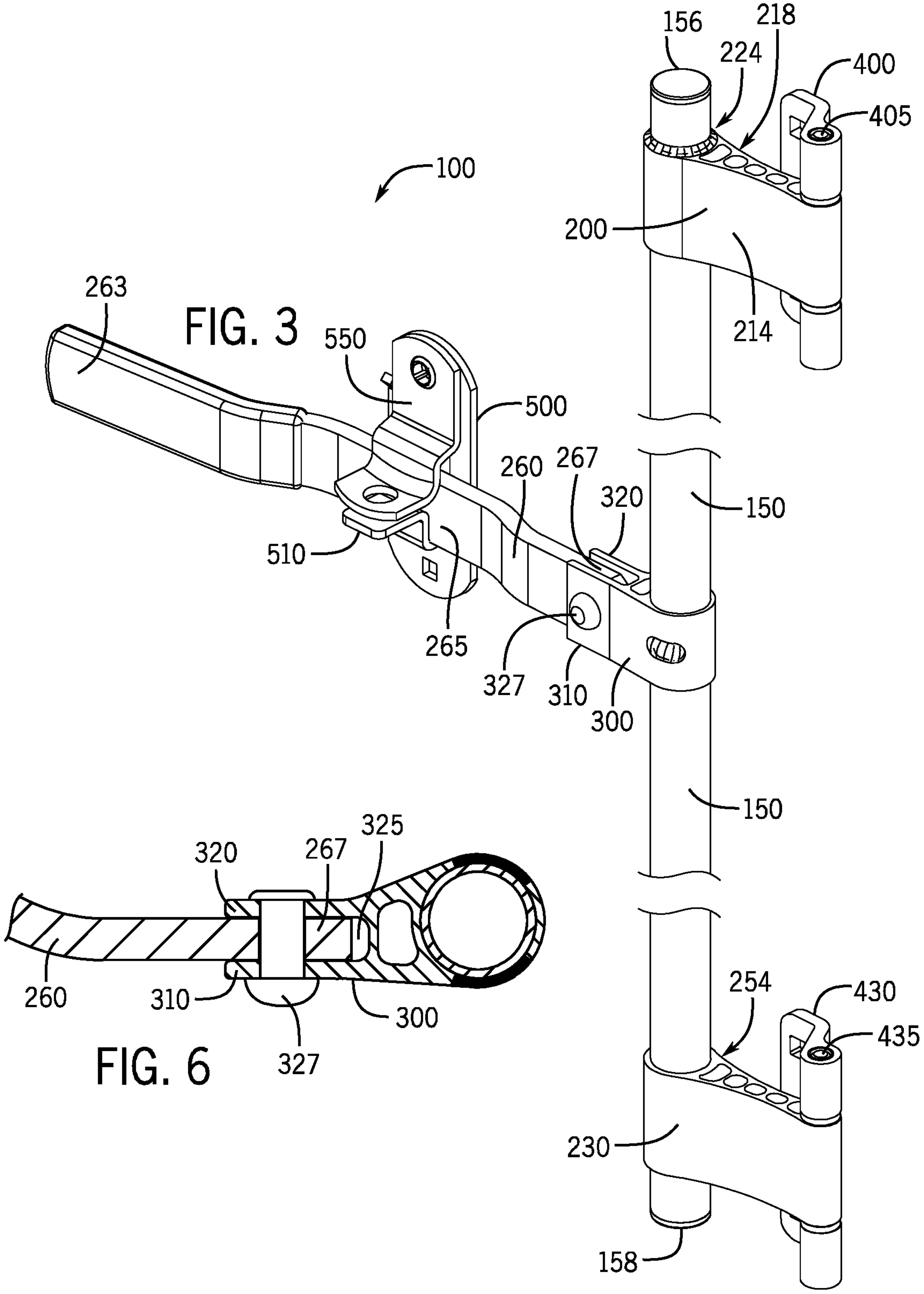
FIG. 3 is a perspective view of the bar lock.
FIG. 6 is a sectional view of the bar lock at the handle bracket.

A bar lock 100 is shown with respect to FIGS. 1-10. The bar lock 100 is used to hold and/or secure a door, ramp, other closure in a secured position. With respect to FIG. 1, the bar lock 100 is shown holding a door 110 in a closed position. The door 110 is over a rear opening of a truck 130. The door 110 is hingedly engaged to the truck 130. In this aspect, the door 110 swings up and down between open and closed positions. In other aspects, the door 110 may swing horizontally between open and closed positions. In other aspects, multiple bar locks 100 may be used with a single door or with multiple doors.

The bar lock 100 generally includes a bar 150, an upper strap 200, an upper hinge butt 400, a lower strap 230, a lower hinge butt 430, a handle 260, and a handle bracket 300.

The handle 260 pivots or rotates relative to the bar 150. The bar 150, the upper strap 200, and the lower strap 230 pivot or hingedly move relative to the upper hinge butt 400 and the lower hinge butt 430.

The handle 260 is pivotally or rotatably engaged to the handle bracket 300. The handle bracket 300 is affixed to the bar 150. In this aspect, the handle bracket 300 is affixed to a central portion of the bar 150. In other aspects, the handle bracket 300 may be affixed to the bar 150 in an off-center position, such as closer to either of the upper strap 200 or the lower strap 230.

The upper strap 200 is affixed to an upper portion of the bar 150, and the lower strap 230 is affixed to a lower portion of the bar 150. The handle bracket 300 is affixed to the bar 150 between the upper strap 200 and the lower strap 230. The upper strap 200 is hingedly engaged to the upper hinge butt 400, while the lower strap 230 is hingedly engaged to the lower hinge butt 430. During installation, the upper hinge butt 400 and the lower hinge butt 430 are affixed to the truck 130 along its rear opening. Thus, the bar 150 pivots or hinges relative to the upper hinge butt 400, the lower hinge butt 430, and the truck 130, while the handle 260 pivots or rotates relative to the bar 150. In other aspects, additional hinge butts and hinge straps may be employed by the bar lock 100.

The handle 260 pivots or rotates relative to the bar 150 to engage and disengage the handle 260 from a hasp 500. The handle 260 includes a grip portion 263 opposite of a connecting portion 267. The connecting portion 267 of the handle 260 engages to the handle bracket 300.

The hasp 500 is mounted on an exterior surface 112 of the door 110. The hasp 500 includes a bracket portion 510, which receives a central portion 265 of the handle 260. When the handle 260 is moved downward to the closed position, the handle 260 wedges into the hasp 500, which drives the bar 150 toward the closed position. In this aspect, the hasp 500 includes a rotatable locking portion 550, which is configured to rotate over the central portion 265 of the handle 260 and prevent the handle 260 from moving upward to an unlocked position. The bracket portion 510 and the rotatable locking portion 550 may include complementary lock openings to receive a pad lock or other lock.

The upper strap 200 is engaged to the upper hinge butt 400, while the lower strap 230 is engaged to the lower hinge butt 430. In this aspect, hinge pins 405 and 435 hold the upper strap 200 engaged with the upper hinge butt 400 and the lower strap 230 engaged to the lower hinge butt 430, respectively.

In this aspect, the bar 150 includes a generally circular or round cross-section. The bar 150 is an elongate member. The bar 150 may include a hollow construction formed from an extrusion process. The bar 150 includes a length sufficient to provide a closing force to the door 110. The bar 150 includes an outer surface 155. The bar 150 may be formed from an extrusion process.

The upper strap 200 forms an upper cylindrical passage 205, while the lower strap 230 forms a lower cylindrical passage 235. During manufacture, the bar 150 is passed through the upper cylindrical passage 205 and the lower cylindrical passage 235. The upper cylindrical passage 205 includes an upper opening 210 and a lower opening 215. The upper cylindrical passage 205 includes an inner surface 207. The lower cylindrical passage 235 includes an upper opening 240 and a lower opening 245. The lower cylindrical passage 235 includes an inner surface 237. In this aspect, the lower opening 245 of the lower cylindrical passage 235 and the upper opening 210 of the upper cylindrical passage 205 are on opposite or outer sides of the bar lock 100. An upper weld 220 is formed between the upper opening 210 and the outer surface 155 of the bar 150. A lower weld 250 is formed between the lower opening 245 and the outer surface 155 of the bar 150.

Figure 8:
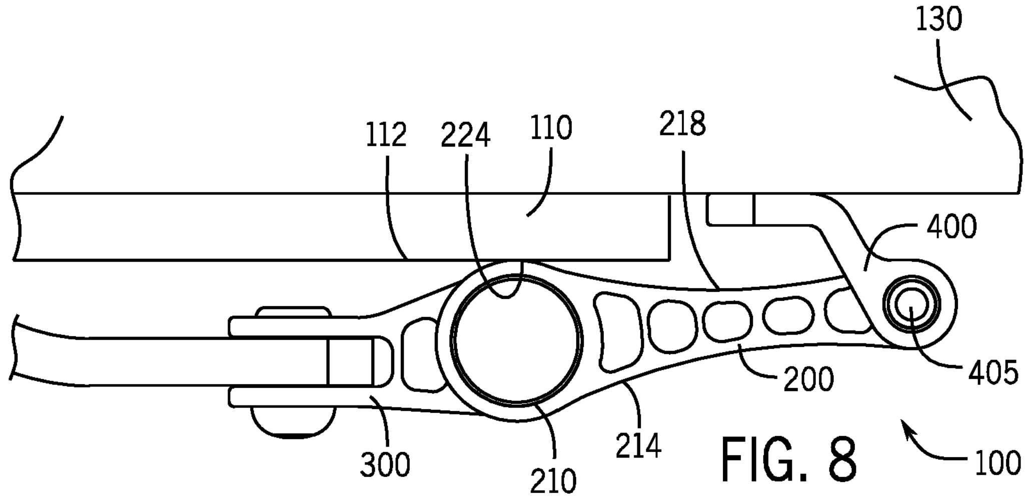
FIG. 8 is a top down view showing the strap pressing against the door of the truck.
Figure 9:
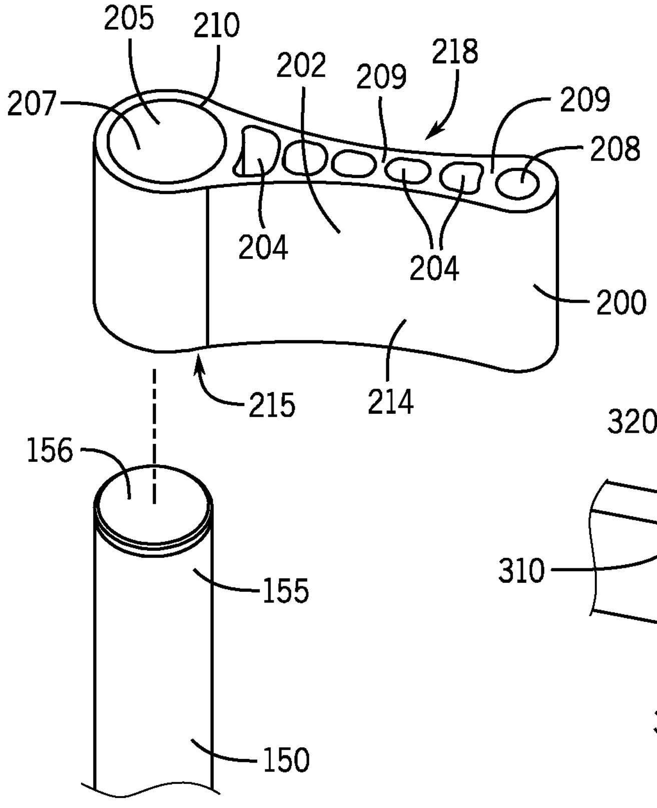
FIG. 9 is a perspective view of the tube inserting into the strap.

With reference to FIGS. 8 and 9, the upper strap 200 includes a first concave exterior wall 214 and a second concave exterior wall 218 extending between the upper cylindrical passage 205 and a hinge passage 208. The upper strap 200 includes the upper cylindrical passage 205 generally parallel to the hinge passage 208. The upper strap 200 includes a central portion 202, and the upper cylindrical passage 205 and the hinge passage 208 are on opposite sides of the central portion 202. The central portion 202 of the upper strap 200 include one or more hollow passages 204 to save in material usage and ribs 209 to improve strength. The hollow passages 204 are generally parallel to the cylindrical passage 205 and the hinge passage 208. The second concave exterior wall 218 provides for an exterior contact surface 224 of the upper strap 200 to urge against the exterior surface 112 of the door 110 without interference from other portions or surface of the upper strap 200. Similarly, an exterior contact surface 254 of the lower strap 230 urges against the exterior surface 112 of the door 110.

Figure 10:
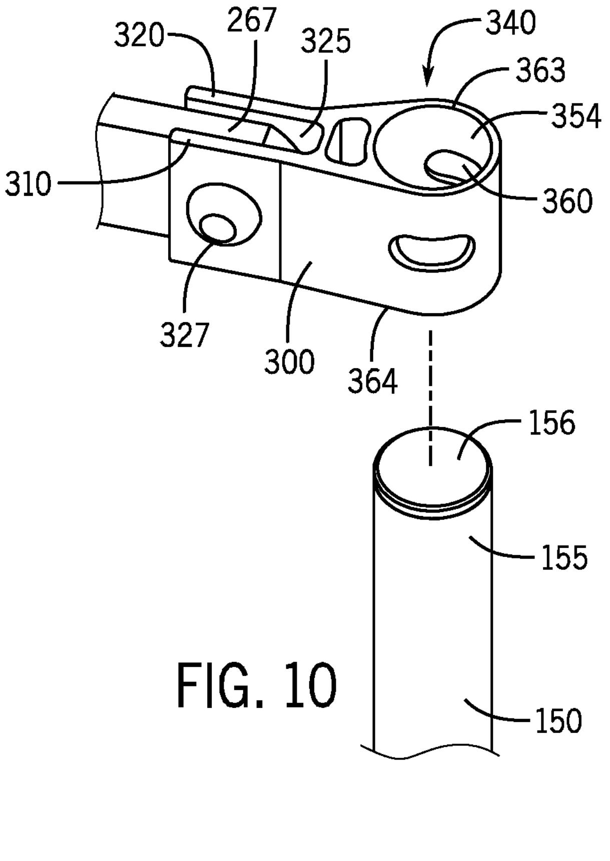
FIG. 10 is a perspective view of the tube inserting into the handle bracket.

With reference to FIG. 10, the handle bracket 300 will now be described. The handle bracket 300 includes a first arm 310 and a second arm 320 that forms a slot 325 which receives the connecting portion 267 of the handle 260. A fastener 327 rotatably holds or engages the connecting portion 267. Opposite of the first arm 310 and the second arm 320, the handle bracket 300 forms a cylindrical passage 340. A body 344 of the cylindrical passage 340 includes one or more openings 360. The cylindrical passage 340 receives the bar 150. The circular design of the cylindrical passage 340 provides for maximum weld length and to prevent components from breaking at the bar 150. The body 344 includes the one or more openings 360, which pass through the body 344 and into the cylindrical passage 340. In this aspect, the one or more openings 360 pass completely through the body 344. In this aspect, the one or more openings 360 include an ovular shape.

An inner surface 354 of the cylindrical passage 340 is against the outer surface 155 of the bar 150. In this aspect, one or more plug welds 362 are formed in the one or more openings 360 in the body 344. The openings 360 are formed between an upper edge 363 and a lower edge 364 of the cylindrical passage 340. The openings 360 are spaced between the upper edge 363 and the lower edge 364 of the cylindrical passage 340. In this aspect, the openings 360 are formed approximate equidistant from the upper edge 363 and the lower edge 364 of the cylindrical passage 340. There is no welding between much of the inner surface 354 of the cylindrical passage 340 and the outer surface 155 of the bar 150. This prevents degradation of the heat-treated or tempered alloy that forms the handle bracket 300, which could make the handle bracket 300 brittle or weak. The one or more plug welds 362 positioned toward or at a center of the handle bracket 300 reduce high stress on lateral sides of the handle bracket 300. In certain aspects, by forming the more plug welds 362 in a central location of the contact or joint between the cylindrical passage 340 and the outer surface 155 of the bar 150, the bar 150 may bend, bend, bow or flex at the upper edge 363 and at the lower edge 364 of the cylindrical passage 340 without damaging the one or more plug welds 362.

The handle bracket 300 may be used with other bar locks, straps, and hinges than the bar lock 100, the bar 150, the straps 200 and 230, and the butts 400 and 430 described herein. For example, the handle bracket 300 could be used with straps that are affixed to the bar through a full weld or bolts.

When the handle 260 is moved downward and forced inward into the bracket portion 510, the exterior contact surface 224 of the upper strap 200 and the exterior contact surface 254 of the lower strap 230 are urged against the exterior surface 112 of the door 110, which pushes and/or maintains the door 110 in the closed position. A force from the handle 260 wedging into the bracket portion 510 is transferred to a central portion of the bar 150 via the handle bracket 300, and the bar 150 is urged inward toward the door 110, which forces the exterior contact surfaces 224 and 254 against the exterior surface 112 of the door 110. In this aspect, the bar 150 may bow, bend, or deform slightly inward toward the door 110 due to the force from the handle 260. By forming the upper weld 220 at the junction of the upper opening 210 and the outer surface 155 of the bar 150 and by forming the lower weld 250 at the junction of the lower opening 245 and the outer surface 155 of the bar 150, the bar 150 is permitted to deform, bow, or bend at or proximal to inner contact points of the lower opening 215 and the outer surface 155 of the bar 150 and of the upper opening 240 and the outer surface 155 of the bar 150, which preserves the strength of the bar lock 100.

The upper weld 220 and the lower weld 250 may be formed using continuous, spot, and/or stitch welding techniques.

The upper weld 220, the lower weld 250, and the plug welds 362 may be formed using conventional welding techniques, such as, for example, MIG (metal inert gas) and TIG (tungsten inert gas) welding.

The bar lock 100 and its components may be formed from tempered aluminum, such as, for example 6061-T6 aluminum alloy.

By forming the upper weld 220 at the junction of the upper opening 210 and the outer surface 155 of the bar 150 and by forming the lower weld 250 at the junction of the lower opening 245 and the outer surface 155 of the bar 150, much of the strength of the upper strap 200 and the lower strap 230 is not diminished.

In this aspect, there is no or only minimal welding at the junction of the lower opening 215 and the outer surface 155 of the bar 150 and there is no welding or only minimal welding at the junction of the upper opening 240 and the outer surface 155 of the bar 150. Instead, the welding occurs at the further sides of the upper strap 200 and the lower strap 230. The upper strap 200 and the lower strap 230 are welded to the bar 150 via the upper weld 220 and the lower weld 250 such that a distance between the upper weld 220 and the lower weld 250 is greater than a distance between the lower opening 215 of the upper strap 200 and the upper opening 240 of the lower strap 230.

By welding at the distal or outer junctions of the upper opening 210 and the outer surface 155 of the bar 150 and the lower opening 245 and the outer surface 155 of the bar 150, heat from the welding does not weaken or diminish the material in the remaining portions of the bar 150. There is no or only minimal welding at the proximal or inner contact points of the lower opening 215 and the outer surface 155 of the bar 150 and of the upper opening 240 and the outer surface 155 of the bar 150. By not welding the entire contact region between the inner surface 207 and the inner surface 237, the tempering of the aluminum alloy is not diminished.

Several of the components of the bar lock 100 may be formed from extrusion processes. For example, the bar 150, the upper strap 200, the lower strap 230, and the handle bracket 300 may be formed from extrusion processes. In certain aspects, the upper strap 200 and the lower strap 230 are identical and may be formed from the same extrusion process. Multiple upper straps 200 and lower straps 230 may be cut from extruded stock of the straps.

During the manufacture of the bar lock 100, the upper strap 200 and the lower strap 230 are positioned on the bar 150 with the handle bracket 300 positioned on the bar 150 between the upper strap 200 and the lower strap 230. For example, an upper end 156 of the bar 150 may be inserted into the cylindrical passage 340 of the handle bracket 300. Next, the upper end 156 of the bar 150 may be inserted into the upper cylindrical passage 205 of the upper strap 200. Then, then a lower end 158 of the bar 150 may be inserted into the lower cylindrical passage 235. Finally, the handle bracket 300, the upper strap 200, and the lower strap 230 are welded to the bar 150 as described herein. Of course, one of ordinary skill in the art will recognize that the order and/or direction in which the handle bracket 300, the upper strap 200, and the lower strap 230 are positioned on the bar 150 is subject to change. For example, the upper end 156 of the bar 150 may be inserted through the lower cylindrical passage 235 of the lower strap 230, next the upper end 156 of the bar 150 may be inserted through the cylindrical passage 340 of the handle bracket 300, and the upper end 156 of the bar 150 may be inserted through the upper cylindrical passage 205 of the upper strap 200.

After the handle bracket 300, the upper strap 200, and the lower strap 230 are positioned on the bar 150, these components are welded the bar 150. The one or more plug welds 362 are formed in the one or more openings 360 in the body 344 of the handle bracket 300, and the one or more plug welds 362 joins the outer surface 155 of the bar 150 with the handle bracket 300.

The upper weld 220 is formed between the upper opening 210 of the upper strap 200 and the outer surface 155 of the bar 150. The lower weld 250 is formed between the lower opening 245 of the lower strap 230 and the outer surface 155 of the bar 150. As such, there is no weld between most of the overlap of the inner surface 207 of the upper strap 200 and the outer surface 155 of the bar 150, and there is no weld between most of the overlap of the inner surface 237 of the lower strap 230 and the outer surface 155 of the bar 150, which preserves the strength of the tempered aluminum alloy. In certain aspects, the outer surface 155 of the bar 150 may float against the inner surface 207 of the upper strap 200 at the lower opening 215 and the outer surface 155 of the bar 150 may float against the inner surface 237 of the lower strap 230 at the upper opening 240, and the bar 150 may deform, bow, or bend in this region.

By limiting the upper weld 220 to the outer or upper side of the upper strap 200 and by limiting the lower weld 250 to the outer or lower side of the lower strap 230, the strength of the straps 200 and 230 and the bar 150 is preserved.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A bar lock, comprising:

a bar;

an upper strap;

the upper strap forms an upper cylindrical passage that receives the bar, the upper cylindrical passage having an upper opening and a lower opening, an upper weld between the upper opening and the bar;

an upper hinge butt, the upper strap hingedly engaged to the upper hinge butt, the upper strap configured to move or pivot relative to the upper hinge butt;

a lower strap;

the lower strap forms a lower cylindrical passage that receives the bar, the lower cylindrical passage having an upper opening and a lower opening, a lower weld between the lower opening and the bar;

a lower hinge butt, the lower strap hingedly engaged to the lower hinge butt, the lower strap configured to move or pivot relative to the lower hinge butt;

a handle bracket affixed to the bar;

a handle pivotally engaged to the handle bracket; and wherein the bar floats at a junction of the lower opening of the upper cylindrical passage and an outer surface of the bar, and the bar floats at a junction of the upper opening of the lower cylindrical passage and the outer surface of the bar.

2. The bar lock according to claim 1, wherein the upper weld is formed between the upper opening of the upper strap and an outer surface of the bar, and the lower weld is formed between the lower opening of the lower strap and the outer surface of the bar.

3. The bar lock according to claim 1, wherein the handle bracket having a body defining a cylindrical passage that receives the bar.

4. The bar lock according to claim 3, wherein the body of the handle bracket includes one or more openings that pass through the body and into the cylindrical passage.

5. The bar lock according to claim 4, wherein the one or more openings are formed between an upper edge and a lower edge of the cylindrical passage of the body of the handle bracket.

6. The bar lock according to claim 1, wherein the handle bracket having a body defining a cylindrical passage that receives the bar.

7. A bar lock, comprising:

a bar;

an upper strap;

the upper strap forms an upper cylindrical passage that receives the bar, the upper cylindrical passage having an upper opening and a lower opening, an upper weld between the upper opening and the bar;

an upper hinge butt, the upper strap hingedly engaged to the upper hinge butt, the upper strap configured to move or pivot relative to the upper hinge butt;

a lower strap;

the lower strap forms a lower cylindrical passage that receives the bar, the lower cylindrical passage having an upper opening and a lower opening, a lower weld between the lower opening and the bar;

a lower hinge butt, the lower strap hingedly engaged to the lower hinge butt, the lower strap configured to move or pivot relative to the lower hinge butt;

a handle bracket affixed to the bar;

a handle pivotally engaged to the handle bracket; and, wherein there is no weld at a junction of the lower opening of the upper cylindrical passage and an outer surface of the bar, and there is no weld at a junction of the upper opening of the lower cylindrical passage and the outer surface of the bar.

8. A bar lock, comprising:

a bar;

an upper strap;

the upper strap forms an upper cylindrical passage that receives the bar, the upper cylindrical passage having an upper opening and a lower opening, an upper weld between the upper opening and the bar;

an upper hinge butt, the upper strap hingedly engaged to the upper hinge butt, the upper strap configured to move or pivot relative to the upper hinge butt;

a lower strap;

the lower strap forms a lower cylindrical passage that receives the bar, the lower cylindrical passage having an upper opening and a lower opening, a lower weld between the lower opening and the bar;

a lower hinge butt, the lower strap hingedly engaged to the lower hinge butt, the lower strap configured to move or pivot relative to the lower hinge butt:

a handle bracket affixed to the bar;

a handle pivotally engaged to the handle bracket; and, wherein there is no weld between an overlap of an inner surface of the cylindrical passage of the upper strap and an outer surface of the bar, and there is no weld between an overlap of an inner surface of the cylindrical passage of the lower strap and the outer surface of the bar.

9. A bar lock, comprising:

a bar;

an upper strap;

the upper strap forms an upper cylindrical passage that receives the bar, the upper cylindrical passage having an upper opening and a lower opening, an upper weld between the upper opening and the bar;

a lower strap;

the lower strap forms a lower cylindrical passage that receives the bar, the lower cylindrical passage having an upper opening and a lower opening, a lower weld between the lower opening and the bar;

a handle bracket affixed to the bar;

a handle pivotally engaged to the handle bracket; and wherein the upper strap includes the upper cylindrical passage generally parallel to a hinge passage, wherein the upper strap includes a central portion, and the upper cylindrical passage and the hinge passage are on opposite sides of the central portion, and wherein the upper strap includes hollow passages and ribs between the upper cylindrical passage and the hinge passage.

10. The bar lock according to claim 9, wherein the upper strap includes a first concave exterior wall and a second concave exterior wall extending between the upper cylindrical passage and the hinge passage.

11. A method of forming a bar lock, comprising:

providing a bar, an upper strap, an upper hinge butt, wherein the upper strap forms an upper cylindrical passage having an upper opening and a lower opening, and a lower strap, and a lower hinge butt, wherein the lower strap forms a lower cylindrical passage having an upper opening and a lower opening, wherein the upper strap is configured to move or pivot relative to the upper hinge butt, wherein the lower strap is configured to move or pivot relative to the lower hinge butt, wherein the upper strap includes the upper cylindrical passage generally parallel to a hinge passage, wherein the upper strap includes a central portion, and the upper cylindrical passage and the hinge passage are on opposite sides of the central portion, and wherein the upper strap includes hollow passages and ribs between the upper cylindrical passage and the hinge passage;

inserting the bar through the upper cylindrical passage;

forming an upper weld between the upper opening of the upper strap and the bar;

inserting the bar through the lower cylindrical passage;

forming a lower weld between the lower opening of the lower strap and the bar; and affixing a handle bracket to the bar.

12. The method of forming the bar lock according to claim 11, further comprising forming the bar, the upper strap, and the lower strap through extrusion processes.

13. The method of forming the bar lock according to claim 11, further comprising cutting the upper strap and the lower strap from a same stock of extruded material.

14. The method of forming the bar lock according to claim 11, further comprising inserting the bar through a cylindrical passage of the handle bracket, and welding plugs in openings of the handle bracket.

15. A bar lock, comprising:

a bar;

an upper strap;

the upper strap forms an upper cylindrical passage that receives the bar, the upper cylindrical passage having an upper opening and a lower opening, an upper hinge butt, the upper strap hingedly engaged to the upper hinge butt, the upper strap configured to move or pivot relative to the upper hinge butt;

a lower strap;

the lower strap forms a lower cylindrical passage that receives the bar, the lower cylindrical passage having an upper opening and a lower opening, a lower hinge butt, the lower strap hingedly engaged to the lower hinge butt, the lower strap configured to move or pivot relative to the lower hinge butt;

a handle bracket affixed to the bar;

a handle pivotally engaged to the handle bracket; and wherein the upper strap includes the upper cylindrical passage generally parallel to a hinge passage, wherein the upper strap includes a central portion, and the upper cylindrical passage and the hinge passage are on opposite sides of the central portion, and wherein the upper strap includes hollow passages and ribs between the upper cylindrical passage and the hinge passage.

16. The bar lock according to claim 6, wherein the body of the handle bracket includes one or more openings that pass through the body and into the cylindrical passage.

17. The bar lock according to claim 16, wherein a plug weld is between the one or more openings and the bar.

* * * * *